United States Patent [19]
Matsuo

[11] Patent Number: 6,015,159
[45] Date of Patent: Jan. 18, 2000

[54] METHOD AND APPARATUS FOR SHIFTING A BICYCLE TRANSMISSION

[75] Inventor: Nobuyuki Matsuo, Shimonoseki, Japan

[73] Assignee: Shimano, Inc., Osaka, Japan

[21] Appl. No.: 08/927,920

[22] Filed: Sep. 11, 1997

[30] Foreign Application Priority Data

Sep. 20, 1996 [JP] Japan ................................. 8-271434

[51] Int. Cl.⁷ .................................................. B62M 9/00
[52] U.S. Cl. ..................... 280/238; 280/236; 280/260; 474/70; 474/103
[58] Field of Search .................................. 280/236, 238, 280/260; 474/70, 71, 102, 103, 104, 109, 110

[56] References Cited

U.S. PATENT DOCUMENTS

| | | | |
|---|---|---|---|
| 5,213,548 | 5/1993 | Colbert et al. | 474/71 |
| 5,407,396 | 4/1995 | Gilbert | 474/80 |

FOREIGN PATENT DOCUMENTS

| | | | |
|---|---|---|---|
| 0 529664 A2 | 3/1993 | European Pat. Off. | B62J 39/00 |
| 8-40425 | 2/1996 | Japan | B62M 23/02 |
| 8-113181 | 5/1996 | Japan | B62M 9/12 |
| WO 91/17078 | 11/1991 | WIPO | |
| WO 95/26900 | 10/1995 | WIPO | |

*Primary Examiner*—Daniel G. DePumpo
*Attorney, Agent, or Firm*—James A. Deland

[57] ABSTRACT

A bicycle shift control device includes a pedaling force determining unit for determining a pedaling force exerted on a pedaling member and a shift stage determining unit which determines an optimum shift stage of a bicycle transmission from the pedaling force. In a more specific embodiment, the shift control device includes a memory that stores first and second pedaling force values for a shift stage of the bicycle transmission, wherein the second pedaling force value is greater than the first pedaling force value, and first and second traveling speed values for the shift stage of the bicycle transmission, wherein the second traveling speed value is greater than the first traveling speed value. The shift stage determining unit determines an upshift condition when the pedaling force is below the first pedaling force value, the shift stage determining unit determines a downshift condition when the pedaling force is above the second pedaling force value, the shift stage determining unit determines a downshift condition when the traveling speed is below the first traveling speed value, and the shift stage determining unit determines an upshift condition when the traveling speed is above the second traveling speed value.

31 Claims, 7 Drawing Sheets

| SHIFT STAGE | GEAR RATIO r | CONTROL VALUES | | | | |
|---|---|---|---|---|---|---|
| | | SPEED-BASED CONTROL | | | PEDALING FORCE-BASED CONTROL | |
| | | SPEED V1 | SPEED V2 | SPEED RANGE | PEDALING FORCE F1 | PEDALING FORCE F2 |
| 1 SPEED | 1.29 | | 8 km/h | TO 8 km/h | 25 kg | |
| 2 SPEED | 1.61 | 6 km/h | 11 km/h | 6 TO 11 km/h | 25 kg | 32 kg |
| 3 SPEED | 1.81 | 9 km/h | 14 km/h | 9 TO 14 km/h | 25 kg | 32 kg |
| 4 SPEED | 2.11 | 12 km/h | 18 km/h | 12 TO 18 km/h | 30 kg | 32 kg |
| 5 SPEED | 2.44 | 16 km/h | 21 km/h | 16 TO 21 km/h | 45 kg | 45 kg |
| 6 SPEED | 2.80 | 19 km/h | 24 km/h | 19 TO 24 km/h | 45 kg | 45 kg |
| 7 SPEED | 3.21 | 22 km/h | | 22 km/h AND UP | 45 kg | 45 kg |

METHOD AND APPARATUS FOR SHIFTING A BICYCLE TRANSMISSION

BACKGROUND OF THE INVENTION

The present invention is directed to a bicycle computer and, more particularly, to a bicycle computer that can be used to shift a bicycle transmission based on the pedaling force applied by the rider.

Recently, the greater usefulness of bicycles has been increasingly recognized. Also, bicycle sports have fostered the automation of gear shifting in such bicycles, and the lower cost of microcomputers has increased the practical use of such automated bicycle gear shifters.

One type of electronic gear shifting device is disclosed in EP 0 529664A2. Here, the rider presses a button corresponding to a desired gear, and an electric motor positions the bicycle transmission in the selected gear.

A more advanced, automatic gear shifting device is disclosed in U.S. Pat. No. 5,213,548. This device detects the actual gear ratio based on the ratio between the crank speed and the bicycle speed and automatically shifts gears in accordance with a program when the crank is slow and the bicycle speed is fast.

In the technique disclosed in Japanese Laid-Open Patent Application 8-113181, the most suitable shift stage is selected depending on the bicycle speed and acceleration.

In order to properly shift the bicycle transmission, shifting must be done in response to the tensile force of the chain. Unfortunately, the above devices are unable to meet this requirement. For example, in JP 8-113181 the bicycle acceleration and the chain tensile force do not correspond to each other in a 1-to-1 manner. When one is riding uphill or is subject to greater wind pressure as the speed increases, there is no correlation between the acceleration of the bicycle chassis and the crank shaft torque which is proportional to the pedaling force of the feet, that is, the chain tensile force which is proportional thereto. As a result, acceleration data in itself is an inadequate, and even unusable, basis for achieving such control.

There is also a need to develop a bicycle gear shifter allowing the mechanical components of the shift mechanism to be operated under lower loads. The desired bicycle gear shifter should have a short operating delay time and should allow gears to be shifted in a short period of time under continuous low load conditions.

SUMMARY OF THE INVENTION

The present invention is directed to a bicycle shift control device that is capable of automatically shifting a bicycle transmission according to pedaling forces applied by the rider. The shift control device operates competently under rapidly changing conditions and in hilly terrain. If desired, the automatic shift control feature may be disabled to allow the rider to shift manually.

In one embodiment of the present invention, a bicycle shift control device includes a pedaling force determining unit for determining a pedaling force exerted on a pedaling member and a shift stage determining unit which determines an optimum shift stage of a bicycle transmission from the pedaling force. In a more specific embodiment, the shift control device includes a memory that stores first and second pedaling force values for a shift stage of the bicycle transmission, wherein the second pedaling force value is greater than the first pedaling force value. The memory also stores first and second traveling speed values for the shift stage of the bicycle transmission, wherein the second traveling speed value is greater than the first traveling speed value. The shift stage determining unit determines an upshift condition when the pedaling force is below the first pedaling force value, the shift stage determining unit determines a downshift condition when the pedaling force is above the second pedaling force value, the shift stage determining unit determines a downshift condition when the traveling speed is below the first traveling speed value, and the shift stage determining unit determines an upshift condition when the traveling speed is above the second traveling speed value.

In an even more specific embodiment, the shift stage determining unit determines an upshift condition when the pedaling force is below the first pedaling force value and the traveling speed is above the second traveling speed value. To enhance reliability of the shifting decision, the shift stage determining unit determines an elapsed time after it determines that the traveling speed is above the second traveling speed value, and then the shift stage determining unit determines the upshift condition only after the elapsed time is greater than a particular elapsed time value.

DETAILED DESCRIPTION OF THE EMBODIMENTS

Figure 1:
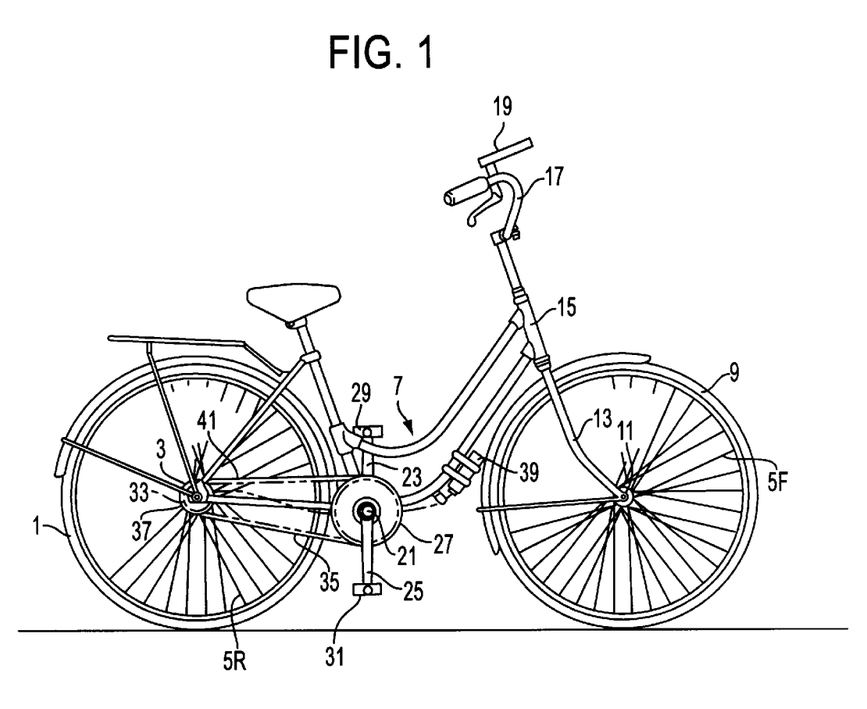
FIG. 1 is a side view of a bicycle that includes a particular embodiment of a shift control device according to the present invention.

FIG. 1 is a side view of a bicycle that includes a particular embodiment of a shift control device according to the present invention. As shown in FIG. 1, the rear wheel axle 3 serving as the rotating shaft of the rear wheel 1 is supported by the rear wheel 1 via a plurality of mutually intersecting linear support members 5R, and a triangle frame 7 is supported by the rear wheel axle 3. The front wheel axle 11 serving as the rotating shaft of the front wheel 9 is supported by the front wheel 9 via a plurality of mutually intersecting linear support members 5F, and a front wheel fork 13 is supported by the front wheel axle 11. The front wheel fork 13 and triangle frame (roughly in the form of a triangle) 7 are joined by a joint frame 15. A handle frame 17 is joined to the elongated end of the front wheel fork 13, and a control panel 19 is attached in the horizontal direction to the handle frame 17. The front and back surfaces of the control panel 19 are roughly horizontal. A crankshaft 21 is rotatably supported by one vertex of the triangle frame 7, and cranks 23 and 25 are fixed to either side of the crankshaft 21.

A drive sprocket 27 is generally integrally joined coaxially to crankshaft 21 via a torque detection mechanism described below, and pedals 29 and 31 are rotatably joined to the ends of the cranks 23 and 25 on either side. A driven sprocket 33 is coaxially fixed to the rear wheel axle 3, and an endless power transmitting chain 35 links the drive sprocket 27 and the driven sprocket 33. An internally installed type of gear shifter 37 is located coaxially with the rear wheel axle 3 at the vertex of a triangular rear frame that is integrated with the triangle frame 7. The internally installed type of gear shifter 37 is a common devices and is thus not described here. A mechanical box 39 serving as a mechanical component for operating the shift control device is attached to the triangle frame 7. The internally mounted type of gear shifter 37 and the mechanical box 39 are linked by a shift cable 41.

A movable element (not shown) housed within mechanical box 39 is capable of displacement to a plurality of locations equal to the number of shift stages in the mechanical gear shifter 37. Similarly, another movable element (not shown) is mounted to gear shifter 37 to shift the gear shifter 37 among the plurality of shift stages. The movable element in the mechanical box 39 is coupled to the movable element mounted to the gear shifter 37 through cable 41 so that the movable element within box 39 can shift the gear shifter 37. The aforementioned moving element within the mechanical box 39 may be driven by a fluid pressure cylinder or servo motor.

Figure 2:
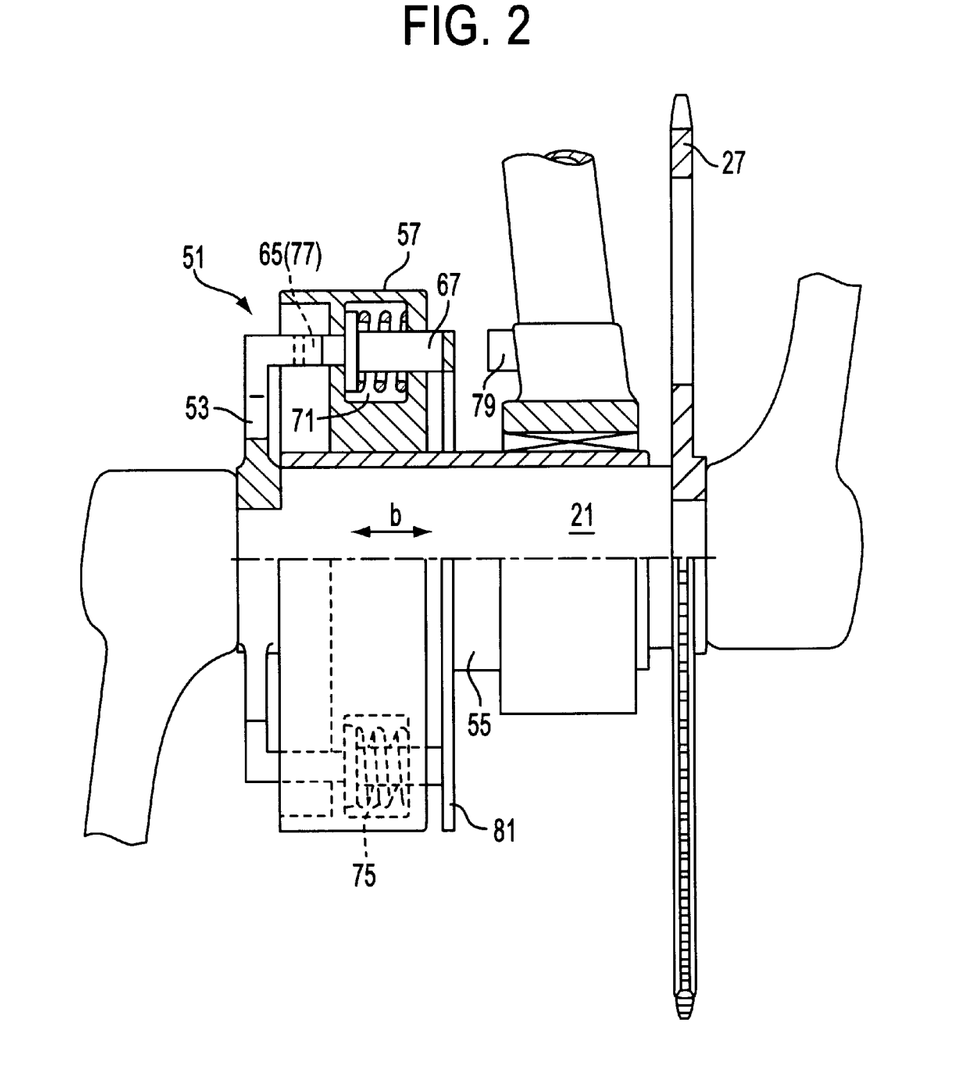
FIG. 2 is a partial cross sectional view of a particular embodiment of a torque detection device used with the shift control device shown in FIG. 1.

FIG. 2 depicts a torque detection device or pedaling force detection device 51. The specific structure of the torque detection device 51 is described in detail in the specification of Japanese Patent Application 8-40425. FIG. 2 schematically depicts the torque detection device 51 to the extent needed to explain the present invention. This description of the means for directly detecting the pedaling force by the feet without reference to the speed differential is intended to aid in the understanding of the present invention. The significance is described in detail below, first by means of mathematical expressions.

The movement of the bicycle is expressed by the following differential equation, wherein the acceleration of the bicycle is expressed as A; the mass obtained by the total of the bicycle chassis, rider weight, and the like is expressed as M; the external force exerted on the bicycle is expressed as G; the value obtained by dividing the torque exerted on the crankshaft by the radius, that is, the pedaling force (limited, for example, to the pedaling force prevailing when the pedal is at the same height position as the crankshaft), is expressed as F, and the linear coordinate for the bicycle is expressed by R.

$$\partial^2(M\cdot R)/\partial t^2 = -M\cdot G + kM\cdot F$$

The second term on the right side is the internal force in the relation between rider and bicycle, so no acceleration should be produced by the bicycle as a result of pedaling force, but for the bicycle in contact with the earth's surface via the wheels, the second term on the right side is external force. The equation indicates that there are cases in when the left side is zero when the first term on the right side is negative, even if the positive pedaling force expressed by the second term on the right side is not zero. In other words, in such instances of zero, the bicycle sometimes does not move, even if the pedaling force is a positive value. The fact that the torque detection device 51 can always detect the value for the second term on the right side as a positive value, even in such cases, is described below.

Figure 3:
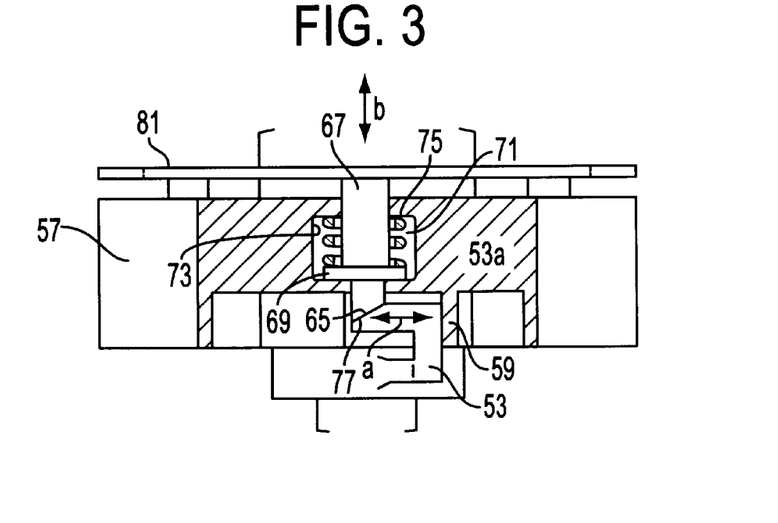
FIG. 3 is a view taken along line III—III in FIG. 4.
Figure 4:
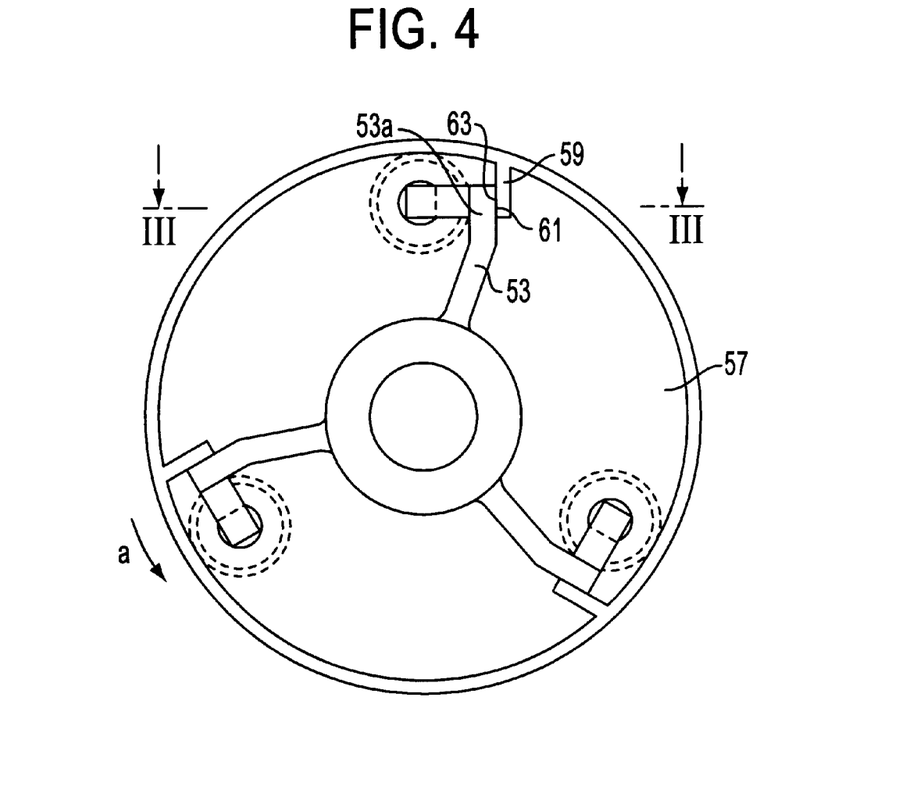
FIG. 4 is a side view of the torque detection device shown in FIG. 2.

As shown in FIGS. 2, 3, and 4, a first torque-detecting power transmitting arm 53 is attached coaxially with the crankshaft 21 so that the first torque-detecting power transmitting arm 53 rotates in complete synchronicity with the crankshaft 21. A forward sprocket shaft 55 is fitted coaxially to the crankshaft 21, and a drive sprocket 27 is coaxially fixed to the forward sprocket shaft 55. A second torque-detecting power transmitting arm 57 (formed in the shape of a cylindrical element) is integrally formed with the forward sprocket shaft 55.

As shown in FIG. 3, a protruding component 59 that protrudes in the axial direction b from the rear component is formed in the rotating direction a of the second torque-detecting power transmitting arm 57. The rear surface 61 to the rear in the rotating direction of the outer end 53a of the first torque-detecting power transmitting arm 53 is always in contact (described below) with the front end surface 63 of the protruding component 59. The front surface (forward surface in the rotating direction a) of the outer end 53a is in the form of an inclined surface 65.

A torque-detecting moving element 67 is slidably located in the second torque-detecting power transmitting arm 57, and the torque-detecting moving element 67 is furnished with a rim 69. The rim 69 can be guided and can slide along the inner surface 73 of a cavity 71 formed inside the second torque-detecting power transmitting arm 57. The torque-detecting moving element 67 is capable of movement slightly in the axial direction b. A coil spring 75 is inserted between the inner wall surfaces of the rim 69 and second torque-detecting power transmitting arm 57. The spring constant of the coil spring 75 is extremely high. That is, the torque-detecting moving element 67 is only slightly displaced.

The exterior end surface of the torque-detecting moving element 67 is formed into a facing inclined surface 77, wherein the inclined surface 65 is always in contact with the facing inclined surface 77 due to the biasing force described below. As shown in FIG. 2, a position detection sensor 79 is fixed to the triangle frame so as to face the torque-detecting moving element 67. The position detection sensor 79 is a proximity sensor that can detect the distance between itself and the torque-detecting moving element 67. The proximity sensor can be constructed in the form of a disk-shaped one-dimensional sensor facing the rotating peripheral surface of the torque-detecting moving element 67.

When the crank is rotated in the forward direction, the outer end 53a of the second torque-detecting power transmitting arm 57 is displaced forwardly in the direction a in FIG. 3. The torque-detecting moving element 67 having the facing inclined surface 77 adjacent to the inclined surface 65 is displaced inwardly in the direction b against the biasing force of the coil spring 75, and the distance between the torque-detecting moving element 67 and the position detection sensor 79 is shortened.

If the shortened length is expressed as $\Delta L$ (the coil spring 75 extends to its natural length when the pedaling force is zero) and the spring constant is expressed as j, then the force can be expressed by the following equation:

$$F = j \cdot \Delta L$$

Thus, the pedaling force F can be determined by calculations based on the detection of the displacement ΔL of the position detection sensor 79. This pedaling force F can be detected in absolute terms as the interior force between the bicycle and rider, no matter what the external conditions are, whether the bicycle is stopped, whether the rider is subject to wind pressure, or whether the bike is going uphill or downhill.

If desired, the torque detection device used in the present invention can be modified as follows. Based on the above structure, three movable torque-detecting moving elements 67 may be placed 120 degrees apart in second torque-detecting power transmitting arms 57, and rings 81 may be coaxially attached to the three torque-detecting moving elements 67.

Position detection sensors 79 are also attached 120 degrees apart on the same surface to the triangle frame 7, and the torque values detected by the three position detection sensors 79 can be averaged. As a result of this modification, the three second torque-detecting power transmitting arms 57 move axially in the same phase proportionally to the torque. The proximal distance between the second torque-detecting power transmitting arms 57 moving continuously in real time and the torque sensors 79 which are proximal sensors is continuously detected in real time. The analog signals for these continuous values are digitalized and input to the microcontroller in real time by means of the latch circuit.

Speed detection devices which detect the speed of a bicycle can be readily constructed of a calculating circuit in which the magnetism of magnets attached to a part of the rear wheel is detected by magnetic detectors fixed to the frame, and the results are divided by the difference in the times showing adjacent peak values. Such a speed detection device is quite common.

Figure 5:
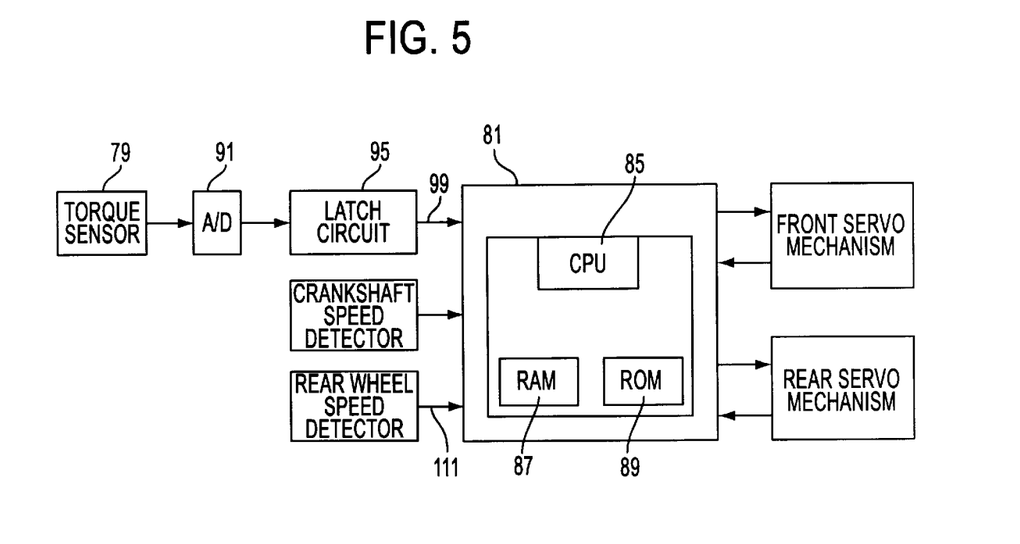
FIG. 5 is a block diagram of a particular embodiment of a control circuit used in the shift control device shown in FIG. 1.

FIG. 5 is a block diagram of the hardware for the microcontroller 81. The microcontroller 81 is housed in mechanical box 39. The microcontroller 81 includes a CPU 85, RAM 87, and ROM 89. An A/D convertor 91 and a latch circuit 95 are located between the torque sensor 79 and microcontroller 81. The output waveform from the torque sensor 79 is digitally converted by the A/D convertor 91 and latch circuit 95 in terms of time function, and a torque signal 99 is input to the microcontroller 81. Similarly, rear wheel speed signals 111 are input to the microcontroller 81 (the A/D convertor and the like are not shown in the figure). A servo mechanism and the microcontroller 81 are bidirectionally electrically connected in the mechanical box 39. As a result of the bidirectional signals communicated between the mechanical box 39 and the microcontroller 81, the position of the end of the shift cable 41 connected to the internally installed type of gear shifter 37, that is, the tension position of the shift cable 41, can be set accordingly.

Figure 6:
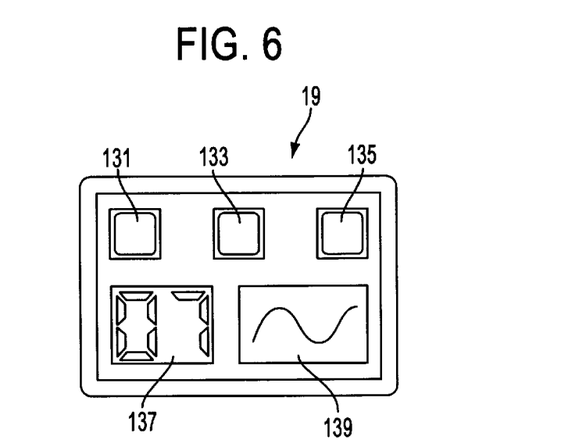
FIG. 6 is a front view of a particular embodiment of a control panel used in the shift control device shown in FIG. 1.

FIG. 6 depicts the front face of the control panel 19. Appearing on the control panel 19 are a power on/off button 131, an automatic mode select button 133, and a manual mode select button 135. The front face of the control panel 19 is equipped with a stage number display surface 137 that displays the number of shift stages and a waveform display surface 139 that displays the torque waveform.

Figure 7:
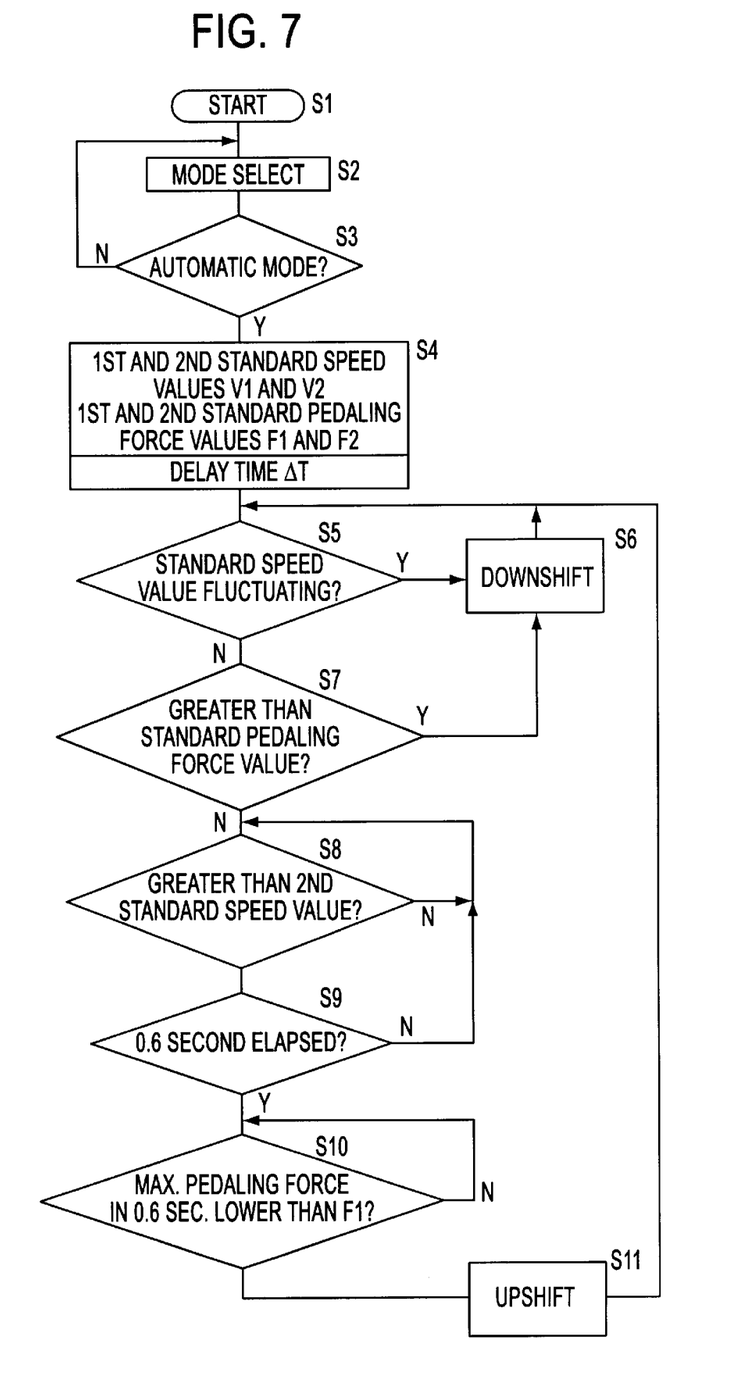
FIG. 7 is a flow chart illustrating a particular embodiment of an algorithm used to operate the shift control device shown in FIG. 1.

The operation of the microcontroller 81 is described below with reference to the flow chart shown in FIG. 7. The power on/off button 131 on the control panel 19 is pushed in a step SI, and either the automatic mode select button 133 or the manual mode select button 135 is pushed in a step S2. If it ascertained in a step S3 that the automatic mode was selected, the program and set value data are input from RAM 87 and ROM 89 to the CPU 85 in a step 4.

Figure 8:
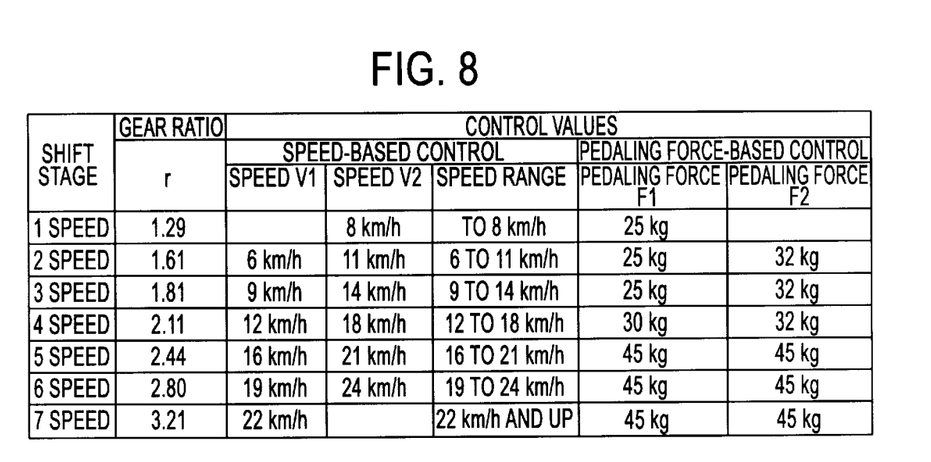
FIG. 8 is a table of representative standard values used in the algorithm shown in FIG. 7.

The set value data are two types of standards speed values V1 and V2, two types of standard pedaling force values F1 and F2, a delay time ΔT, and the like. FIG. 8 depicts the values used in this embodiment of the present invention, which includes seven shift stages. The gear ratio for each shift stage of gear shifter 37 also is noted. In this embodiment, ΔT is 0.6 seconds. The first standard speed value V1 is not greater than the second standard speed value V2 in the same stage. As indicated in the table in FIG. 8, two standard speed values and two standard pedaling force values are matched to each shift stage 1–6 (zero may be used for speed V1 in shift stage 1) and are written in the form of a table in RAM 87.

If it is ascertained in a step S5 that the actual speed is lower than the first speed value V1 for the currently selected gear, the shift stage is downshifted one stage in a step S6. Alternatively, if it is ascertained in a step S7 that the actual pedaling force is greater than the second pedaling force value F2 for the currently selected gear, then the shift stage is downshifted even when the actual speed is not lower than the first standard speed value V1. If the speed is not lower than the first standard speed value V1, and if the pedaling force is not greater than the second pedaling force value V2, then processing continues in a step S8.

If it is ascertained in step S8 that the speed is greater than the second speed value V2, then the program waits until the desired value for Δt, for example, 0.6 second, passes in a step S9. After the desired delay time Δt elapses, it is then ascertained in a step S10 whether the pedaling force is lower than the pedaling force value F1. If so, then the shift stage is upshifted in a step S11. In other words, the shift stage is maintained in its current state when the actual maximum pedaling force has been greater than the first pedaling force value F1 for a given number of seconds or fraction thereof, even when the actual speed increases and rapidly exceeds the second standard speed value V2 in step S8.

Figure 9:
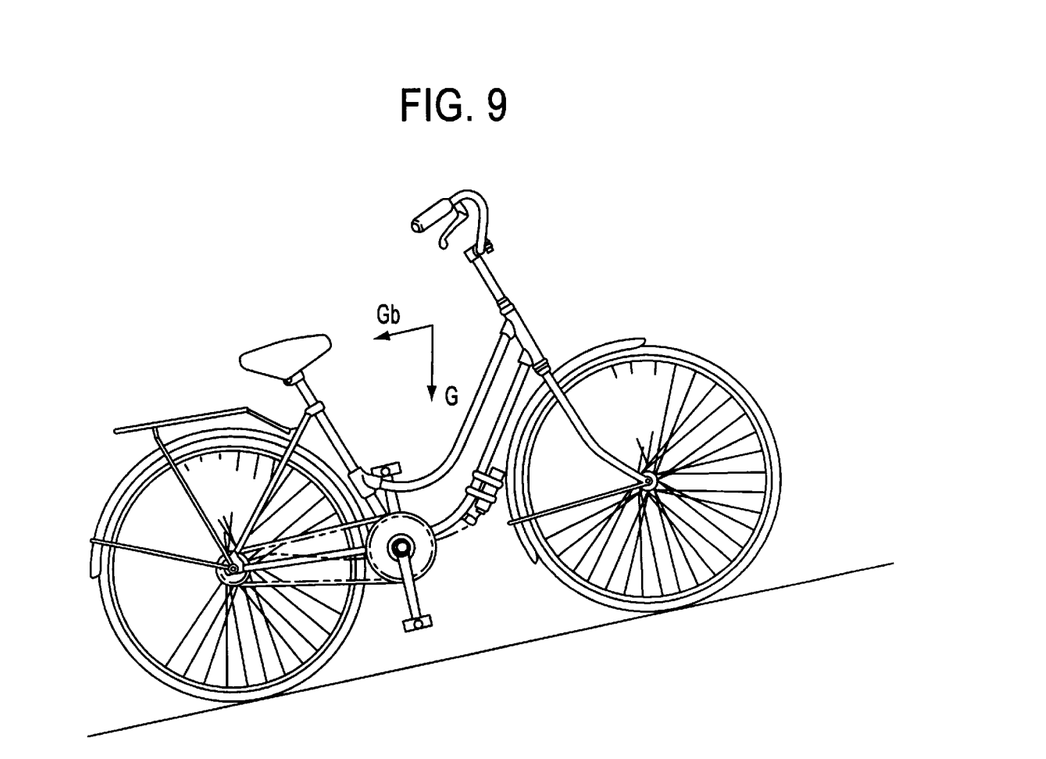
FIG. 9 is a side view of the bicycle shown in FIG. 1 running uphill.

FIG. 9 depicts a bicycle running uphill. As indicated by the above equation, the grade direction component Gb of the downward gravitational acceleration acts on the bicycle. The bicycle sometimes comes to a stop. In such cases, the pedaling force is detected as such in the form of torque. A signal prohibiting shifting may be issued in such cases. When a prohibiting signal is not issued during the ride over the grade, shifting is done in accordance with the table. The automatic gear shifting is effective when the gradient of a hilly road is extremely steep, or when there are extreme changes in the road environment, such as pronounced and repeated variation in the evenness of the road surface, but the shift control is preferably switched to manual mode in some cases, such as when the rider is training.

Figure 10:
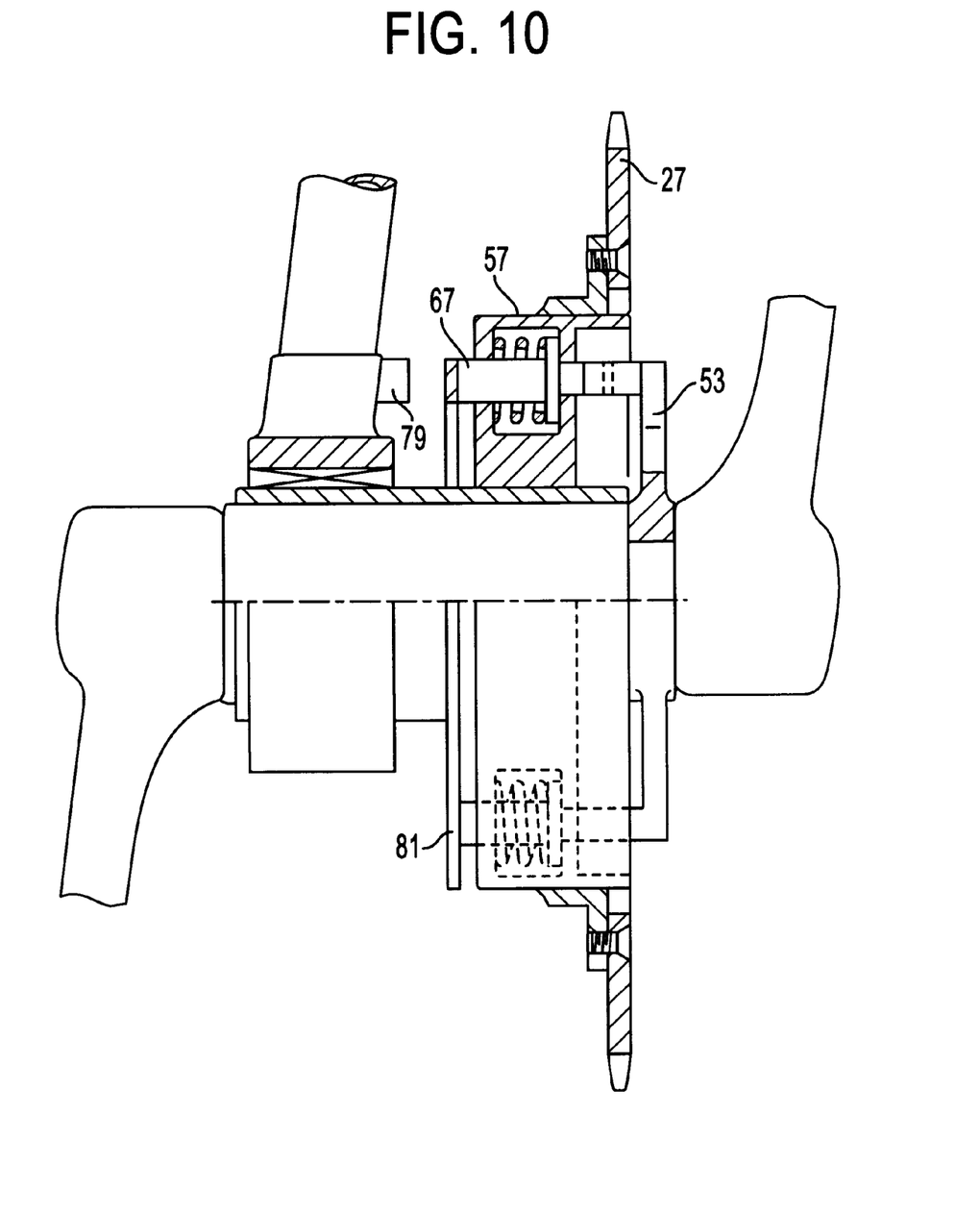
FIG. 10 is a partial cross sectional view of an alternative embodiment of a torque detection device that may be used with the shift control device according to the present invention.

FIG. 10 depicts another embodiment wherein the torque detection devices depicted in FIGS. 2 through 4 have been moved to the right foot side. That is, the second torque-detecting power transmitting arm 57 is moved to the right side. In this embodiment, the drive sprocket 27 can be directly fixed coaxially to the second torque-detecting power transmitting arm 57.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Thus, the scope of the invention should not be limited by the specific structures disclosed. Instead, the true scope of the invention should be determined by the following claims.

What is claimed is:

1. A bicycle shift control apparatus comprising:
   a pedaling force determining unit for determining a pedaling force exerted on a pedaling member; and
   a shift stage determining unit which determines an optimum shift stage of a bicycle transmission from the pedaling force, wherein the shift stage determining unit includes a memory for storing a first pedaling force value and a second pedaling force value for a given shift stage, wherein the second pedaling force value is greater than the first pedaling force value.

2. The apparatus according to claim 1 wherein the shift stage determining unit determines an upshift condition when the pedaling force is below the first pedaling force value.

3. The apparatus according to claim 1 wherein the shift stage determining unit determines a downshift condition when the pedaling force is above the second pedaling force value.

4. The apparatus according to claim 1 wherein the shift stage determining unit determines an upshift condition when the pedaling force is below the first pedaling force value, and wherein the shift stage determining unit determines a downshift condition when the pedaling force is above the second pedaling force value.

5. The apparatus according to claim 1 further comprising a manual mode selecting member for disabling the operation of the shift stage determining unit.

6. A bicycle shift control apparatus comprising:
   a pedaling force determining unit for determining a pedaling force exerted on a pedaling member;
   a speed determining unit for determining a traveling speed of the bicycle; and
   a shift stage determining unit which selects an optimum shift stage of the bicycle transmission from the pedaling force and the traveling speed.

7. The apparatus according to claim 6 wherein the shift stage determining unit includes a memory for storing a first pedaling force value for a shift stage of the bicycle transmission and a first traveling speed value for the shift stage of the bicycle transmission.

8. The apparatus according to claim 7 wherein the shift stage determining unit determines an upshift condition when the pedaling force is below the first pedaling force value.

9. The apparatus according to claim 7 wherein the shift stage determining unit determines a downshift condition when the traveling speed is below the first traveling speed value.

10. The apparatus according to claim 7 wherein the shift stage determining unit determines a downshift condition when the pedaling force is above the first pedaling force value.

11. The apparatus according to claim 7 wherein the shift stage determining unit determines an upshift condition when the traveling speed is above the first traveling speed value.

12. The apparatus according to claim 11 wherein the shift stage determining unit determines an elapsed time after the shift stage determining unit determines that the traveling speed is above the first traveling speed value, and wherein the shift stage determining unit determines the upshift condition only after the elapsed time is greater than a particular elapsed time value.

13. The apparatus according to claim 7 wherein the memory stores a second pedaling force value for the shift stage of the bicycle transmission, wherein the second pedaling force value is greater than the first pedaling force value, wherein the memory stores a second traveling speed value for the shift stage of the bicycle transmission, and wherein the second traveling speed value is greater than the first traveling speed value.

14. The apparatus according to claim 13 wherein the shift stage determining unit determines an upshift condition when the pedaling force is below the first pedaling force value, wherein the shift stage determining unit determines a downshift condition when the pedaling force is above the second pedaling force value, wherein the shift stage determining unit determines a downshift condition when the traveling speed is below the first traveling speed value, and wherein the shift stage determining unit determines an upshift condition when the traveling speed is above the second traveling speed value.

15. The apparatus according to claim 14 wherein the shift stage determining unit determines an upshift condition when the pedaling force is below the first pedaling force value and the traveling speed is above the second traveling speed value.

16. The apparatus according to claim 15 wherein the shift stage determining unit determines an elapsed time after the shift stage determining unit determines that the traveling speed is above the second traveling speed value, and wherein the shift stage determining unit determines the upshift condition only after the elapsed time is greater than a particular elapsed time value.

17. A method of determining when to shift a bicycle transmission comprising the steps of:
   storing, in a memory, a first pedaling force value and a second pedaling force value for a given shift stage of a bicycle transmission, wherein the second pedaling force value is greater than the first pedaling force value;
   determining, by a pedaling force determining unit, a pedaling force exerted on a pedaling unit; and
   automatically determining, by a shift stage determining unit using the first pedaling force value and the second pedaling force value, an optimum shift stage of a bicycle transmission.

18. The method according to claim 17 further comprising the step of determining, by the shift stage determining unit, an upshift condition when the pedaling force is below the first pedaling force value.

19. The method according to claim 17 further comprising the step of determining, by the shift stage determining unit, a downshift condition when the pedaling force is above the second pedaling force value.

20. The method according to claim 17 further comprising the steps of:
   determining, by the shift stage determining unit, an upshift condition when the pedaling force is below the first pedaling force value; and
   determining, by the shift stage determining unit, a downshift condition when the pedaling force is above the second pedaling force value.

21. A method of determining when to shift a bicycle transmission comprising the steps of:
   determining, by a pedaling force determining unit, a pedaling force exerted on a pedaling member;
   determining, by a speed determining unit, a traveling speed of the bicycle; and
   selecting, by a shift stage determining unit, an optimum shift stage of the bicycle transmission from the pedaling force and the traveling speed.

22. The method according to claim 21 further comprising the steps of:
   storing, in a memory, a first pedaling force value for a shift stage of the bicycle transmission; and storing, in the memory, a first traveling speed value for the shift stage of the bicycle transmission.

23. The method according to claim 22 wherein the step of selecting the optimum shift stage comprises the step of determining an upshift condition when the pedaling force is below the first pedaling force value.

24. The method according to claim 22 wherein the step of selecting the optimum shift stage comprises the step of determining a downshift condition when the traveling speed is below the first traveling speed value.

25. The method according to claim 22 wherein the step of selecting the optimum shift stage comprises the step of determining a downshift condition when the pedaling force is above the first pedaling force value.

26. The method according to claim 22 wherein the step of selecting the optimum shift stage comprises the step of determining an upshift condition when the traveling speed is above the first traveling speed value.

27. The method according to claim 26 wherein the step of selecting the optimum shift stage comprises the step of determining an elapsed time after the shift stage determining unit determines that the traveling speed is above the first traveling speed value, wherein the shift stage determining unit determines the upshift condition only after the elapsed time is greater than a particular elapsed time value.

28. The method according to claim 22 further comprising the steps of:

storing, in the memory, a second pedaling force value for the shift stage of the bicycle transmission, wherein the second pedaling force value is greater than the first pedaling force value; and storing, in the memory, a second traveling speed value for the shift stage of the bicycle transmission, wherein the second traveling speed value is greater than the first traveling speed value.

29. The method according to claim 28 wherein the step of selecting the optimum shift stage comprises the steps of:

determining an upshift condition when the pedaling force is below the first pedaling force value;

determining a downshift condition when the pedaling force is above the second pedaling force value;

determining a downshift condition when the traveling speed is below the first traveling speed value; and determining an upshift condition when the traveling speed is above the second traveling speed value.

30. The method according to claim 29 wherein the step of selecting the optimum shift stage comprises the step of determining an upshift condition when the pedaling force is below the first pedaling force value and the traveling speed is above the second traveling speed value.

31. The method according to claim 30 wherein the step of selecting the optimum shift stage comprises the step of determining an elapsed time after the shift stage determining unit determines that the traveling speed is above the second traveling speed value, wherein the shift stage determining unit determines the upshift condition only after the elapsed time is greater than a particular elapsed time value.

* * * * *